Sept. 5, 1950　　　　　　　M. K. SMITH　　　　　　　2,521,549
TRACTOR MOUNTED VINEYARD HOE

Filed Aug. 7, 1946　　　　　　　　　　　　　　　2 Sheets-Sheet 1

MARION K. SMITH.
INVENTOR.

BY
ATTY

Sept. 5, 1950 M. K. SMITH 2,521,549
TRACTOR MOUNTED VINEYARD HOE
Filed Aug. 7, 1946 2 Sheets-Sheet 2
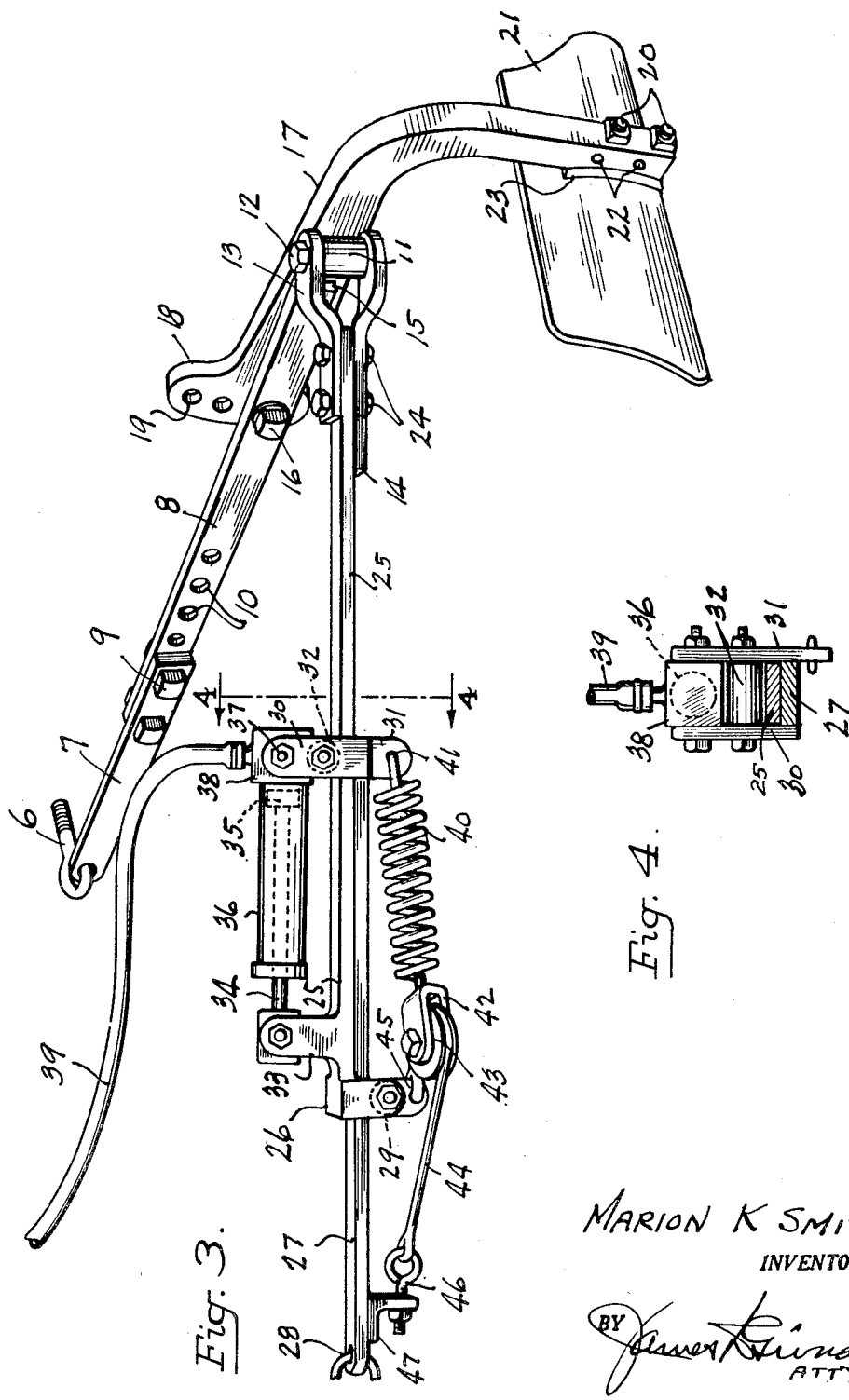
Marion K Smith
INVENTOR.

Patented Sept. 5, 1950

2,521,549

UNITED STATES PATENT OFFICE 2,521,549

TRACTOR MOUNTED VINEYARD HOE

Marion K. Smith, Boring, Oreg.

Application August 7, 1946, Serial No. 688,993

1 Claim. (Cl. 97—137)

This invention relates to improvements in farm tractors and more especially to an attachment to a tractor by means of which a share, moldboard, grape-hoe, disc, or the like, may be accurately and conveniently swung outwardly or inwardly with respect to the line of travel of the tractor for getting between and around various types of farm vegetation such as grape vines, fruit trees, berry bushes, etc., which are spaced too close together to permit movement of a tractor, or plow, or the like, between them.

Another object of the invention is the provision of apparatus of this character which is of simple rugged and durable construction and wherein its several parts are readily accessible for repair or replacement.

The foregoing and other objects will appear as my invention is more fully hereinafter described in the following specification, illustrated in the accompanying drawings and finally pointed out in the appended claim.

In the drawings:

Figure 3 is an enlarged perspective view of the invention detached from the tractor.

Figure 4 is sectional end elevation taken along the line 4—4 of Figure 3.

Figure 1:
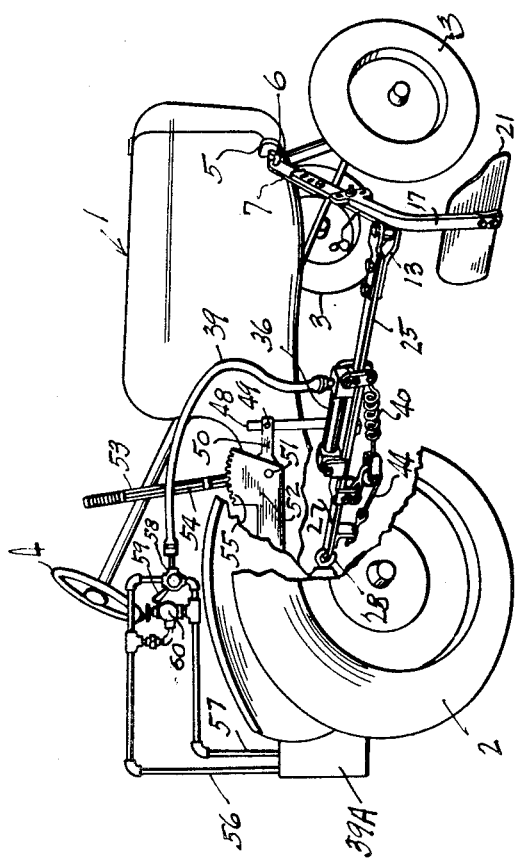
Figure 1 is a perspective view of a farm tractor with parts broken away for convenience of illustration and showing my invention applied thereto.

Referring now more particularly to the drawings:

Reference numeral 1 indicates generally the main body of the tractor having the usual driving wheels 2 and steerable wheels 3 actuated by a steering wheel 4 in the conventional manner. To a projection 5 at the forward end of the tractor body, I attach by means of a bolt 6 the inner end of an arm made up of two sections 7 and 8 adjustably united by means of bolts 9 passing through apertures 10. The outermost end of the section 8 of the arm is looped over on its self as at 11 to receive a bolt 12 for engagement with a shackle 13, whose lower leg is elongated as shown to form a limit stop 14 to be hereinafter more fully described.

Figure 2:
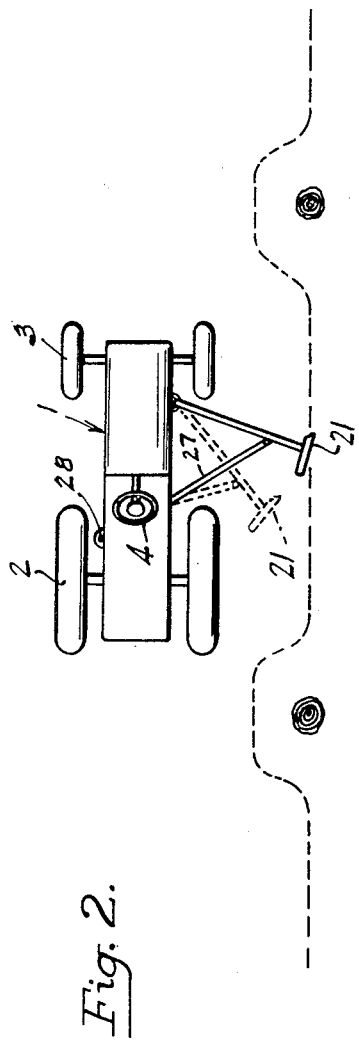
Figure 2 is a reduced diagrammatic top plan view of a tractor showing the invention in two positions of operation.

Swingably and adjustably attached to the outer end of the section 8 of the arm, by means of a pivot bolt 15 and an adjusting bolt 16, is a tool arm 17, enlarged as at 18 at its inner end and apertured as at 19 for receiving the bolt 16 for locking the tool arm in various adjusted positions in a vertical plane. The outer end of the tool arm is turned at right angles to its self as shown and suitably apertured to receive bolts 20 for attachment to a soil working tool such as a share, moldboard, disc, or the like, as previously mentioned, and indicated at 21. As shown in Figures 1 and 3 the tool is shown at right angles to the tool arm 17. By the provision of apertures 22 extending through the tool arm at right angles to those for receiving the bolts 20, I may attach the tool in a position parallel to the tool arm 17 whereby the tool may be used for scraping or hilling the soil where desired. The tool is also adjustable to either side of a vertical plane by means of an arcuate spacer plate 23 in which elongated apertures are formed through which the bolts 20 pass. The shackle 13 by means of bolts 24 operatively connects a movable actuating beam 25 to the section 8 of the arm and the tool arm 17. The opposite end of the beam 25 terminates in a yoke 26 slidably straddling a beam 27 which is swingably attached as at 28 to the under and opposite side of the tractor chassis. Rotatably mounted between the legs of the yoke 26 is a roller 29 to reduce the friction between the actuating beam 25 and the beam 27 in addition to a lubricant which may be applied between the parts. The outermost end of the beam 27 terminates in a pair of vertical parallel plates 30 and 31 which are spaced apart sufficiently to allow freedom of reciprocal movement of the bam 25 between them and beneath a roller 32 rotatably mounted between the plates. Near the inner end of the actuating beam 25 is a vertical bracket 33 within which is mounted one end of a piston rod 34 whose opposite end is provided with a piston 35 slidably mounted within a cylinder 36 whose one end is secured as at 37 to the upper ends of the plates 30 and 31. In open communication with the cylinder head 38, is one end of a pressure line 39 whose opposite end is connected with and receives pressure from any approved type of pressure generator 39A which may be oil, hydraulic, or the like. With the piston in the position shown in Figure 3 the parts are relaxed and the tool 20 and its operating beams are in an outwardly swung position as shown in full lines in Figure 2, and are moved into that position and held there by the action of a tension spring 40 whose one end connects, as at 41, with the lower end of the plate 31. The opposite end of the spring connects with a bracket 42 within which is rotatably mounted a pulley 43. Embracing the pulley is a cable 44 whose one end connects as at 45 with one leg of the yoke 26 and its opposite end, by means of an eye bolt 46, with the underside of the fixed beam 27 by means of a bracket 47. The purpose of the pulley and cable is to absorb one half of the pull or extension of the spring which would otherwise occur if the spring were connected directly to the leg of the yoke 26.

For raising and lowering the tool 20 and its related parts, I provide an arm 48, pivotally attached as at 49 to a bell-crank 50 which is pivoted as at 51 to a bracket 52 and terminates in a handle 53 which is provided with a spring-pressed pawl 54 for engagement with the notched upper edge of the bracket 52 for maintaining the tool in any elevated position with respect to the ground.

Pressure from the generator 39A is directed to and exhausted from the actuating cylinder 36 through the pressure line 39 by means of pipes 56 and 57 through a pressure control valve 58 which when its handle 59 is in the position shown, the pressure through the line 39 is cut off. The pipes 56 and 57 are in connection with each other through a standard safety pressure valve 60 which will automatically by-pass excessive pressure back to the generator. When the handle 59 of the valve is moved into a forward or open position the arm, beam, and soil working tool are moved into the position shown in full lines in Figure 2 and when the valve handle is moved into the closed position, as shown, said elements are retracted into the dotted line position shown, or to any position intermediate this range of operation.

While I have shown a particular form of embodiment of my invention, I am aware that many minor changes therein will readily suggest themselves to others skilled in the art, without departing from the spirit and scope of the invention. Having thus described the invention, what I claim as new and desire to protect by Letters Patent is:

A soil working implement consisting of an arm pivotally connected to the forward end of a farm vehicle and made up of two sections adjustably connected to each other, a tool arm attached to one section of said arm, a beam swingably attached near the opposite end of said vehicle, a second beam slidably mounted upon said first mentioned beam and being connected at one of its ends with said arm, pressure actuated means interposed between the ends of said beams for moving said second beam and arm with respect to the first mentioned beam, resilient means interconnecting the inner ends of said beams through the medium of a pulley and a cable extending therearound, one end of the cable being fixed to one end of said second beam and the opposite end of the cable being attached to one end of the first mentioned beam.

MARION K. SMITH.

REFERENCES CITED

The following references are of record in the file of this patent:

UNITED STATES PATENTS

| Number | Name | Date |
|---|---|---|
| 429,481 | Rockwell | June 3, 1890 |
| 505,506 | Butt | Sept. 26, 1893 |
| 2,253,130 | Lund | Aug. 19, 1941 |